US012730809B2

(12) United States Patent
Yakovlev et al.

(10) Patent No.: US 12,730,809 B2
(45) Date of Patent: Sep. 8, 2026

(54) AUTOMATED PROMPT AUGMENTATION AND ENGINEERING USING ML AUTOMATION IN SQL QUERY ENGINE

(71) Applicant: Oracle International Corporation, Redwood Shores, CA (US)

(72) Inventors: Anatoly Yakovlev, Hayward, CA (US); Sandeep R. Agrawal, San Jose, CA (US); Sanjay Jinturkar, Basking Ridge, NJ (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/934,077

(22) Filed: Oct. 31, 2024

(65) Prior Publication Data

US 2025/0284688 A1 Sep. 11, 2025

Related U.S. Application Data

(60) Provisional application No. 63/563,211, filed on Mar. 8, 2024.

(51) Int. Cl.
*G06F 16/24* (2019.01)
*G06F 16/242* (2019.01)
(Continued)

(52) U.S. Cl.
CPC ...... *G06F 16/24542* (2019.01); *G06F 16/243* (2019.01); *G06F 40/40* (2020.01); *G06N 3/0475* (2023.01)

(58) Field of Classification Search
None
See application file for complete search history.

(56) References Cited

U.S. PATENT DOCUMENTS 5,991,733 A * 11/1999 Aleia ............... G06Q 10/06311 707/999.107
12,135,890 B1 * 11/2024 Lim ........................ G06F 3/067
(Continued)

FOREIGN PATENT DOCUMENTS

| | | |
|---|---|---|
| CM | 117435713 A | 1/2024 |
| CN | 116383349 A | 7/2023 |
| CN | 117609516 A | 2/2024 |

OTHER PUBLICATIONS

Ziegler, Albert et al., "A developer's guide to prompt engineering and LLMs", available: https://github.blog/ai-and-ml/generative-ai/prompt-engineering-guide-generative-ai-llms/.
(Continued)

*Primary Examiner* — Eliyah S. Harper
(74) *Attorney, Agent, or Firm* — Hickman Becker Bingham Ledesma LLP

(57) ABSTRACT

A database system generates a prompt for an LLM or other machine learning (ML) model to narrow the search space to highly relevant information about a database. A distinct instance of a classifier, a clustering algorithm, or a topic modeling model can be trained based on information from ML automation within the database system, respectively for each column or table in the database. Model instances can then be used during generative LLM inferencing to identify relevant sources of data to answer the user's question. Thus, the prompt generation combines ML automation and other ML models or an LLM for topic modeling and schema description.

20 Claims, 6 Drawing Sheets

(51) Int. Cl.

| | |
|---|---|
| ***G06F 16/2453*** | (2019.01) |
| ***G06F 40/40*** | (2020.01) |
| ***G06N 3/0475*** | (2023.01) |

(56) References Cited

U.S. PATENT DOCUMENTS

| | | | | |
|---|---|---|---|---|
| 12,488,014 | B1 * | 12/2025 | Sharma | G06F 16/254 |
| 2016/0140177 | A1 * | 5/2016 | Chamberlin | G06F 16/2455 707/717 |
| 2018/0336198 | A1 * | 11/2018 | Zhong | G06F 16/24522 |
| 2020/0104733 | A1 | 4/2020 | Bart | |
| 2020/0302018 | A1 | 9/2020 | Turkkan et al. | |
| 2021/0406717 | A1 * | 12/2021 | Tauheed | G06N 20/10 |
| 2023/0410801 | A1 * | 12/2023 | Mishra | H04L 51/02 |
| 2025/0104132 | A1 * | 3/2025 | Dasher | G06Q 30/0641 |
| 2025/0139138 | A1 * | 5/2025 | Hays | G06F 16/3329 |
| 2025/0165473 | A1 * | 5/2025 | Lin | G06F 16/24552 |
| 2025/0284688 | A1 * | 9/2025 | Yakovlev | G06F 16/243 |

OTHER PUBLICATIONS

Yang, Hui et al., “Auto-GPT for Online Decision Making: Benchmarks and Additional Opinions”, Jun. 4, 2023, 14 pages.
Wei, Jason et al., “Chain-of-Thought Prompting Elicits Reasoning in Large Language Models”, Jan. 10, 2023, 43 pages.
Wang, Xuezhi et al., “Self-Consistency Improves Chain of Thought Reasoning in Language Models” Mar. 7, 2023, 24 pages.
Shin, et al. “AUTOPROMPT: Eliciting Knowledge from Language Models with Automatically Generated Prompts”, Nov. 7, 2020, 15 pages.
Liu, Nelson F. et al., “Lost in the Middle: How Language Models Use Long Contexts”, Nov. 20, 2023, 18 pages.
Gao et al., “Retrieval-Augmented Generation for Large Language Models: A Survey”, Jan. 5, 2024; Available: https://arxiv.org/pdf/2312.10997v4, 26 pages.
Anonymous, “HeatWave User Guide”, Retrieved on Jan. 5, 2026; Available: URL:https://web.archive.org/web/20211019155144/https://downloads.mysql.com/docs/heatwave-en.a4.pdf, 98 pages.

* cited by examiner

FIG. 4A

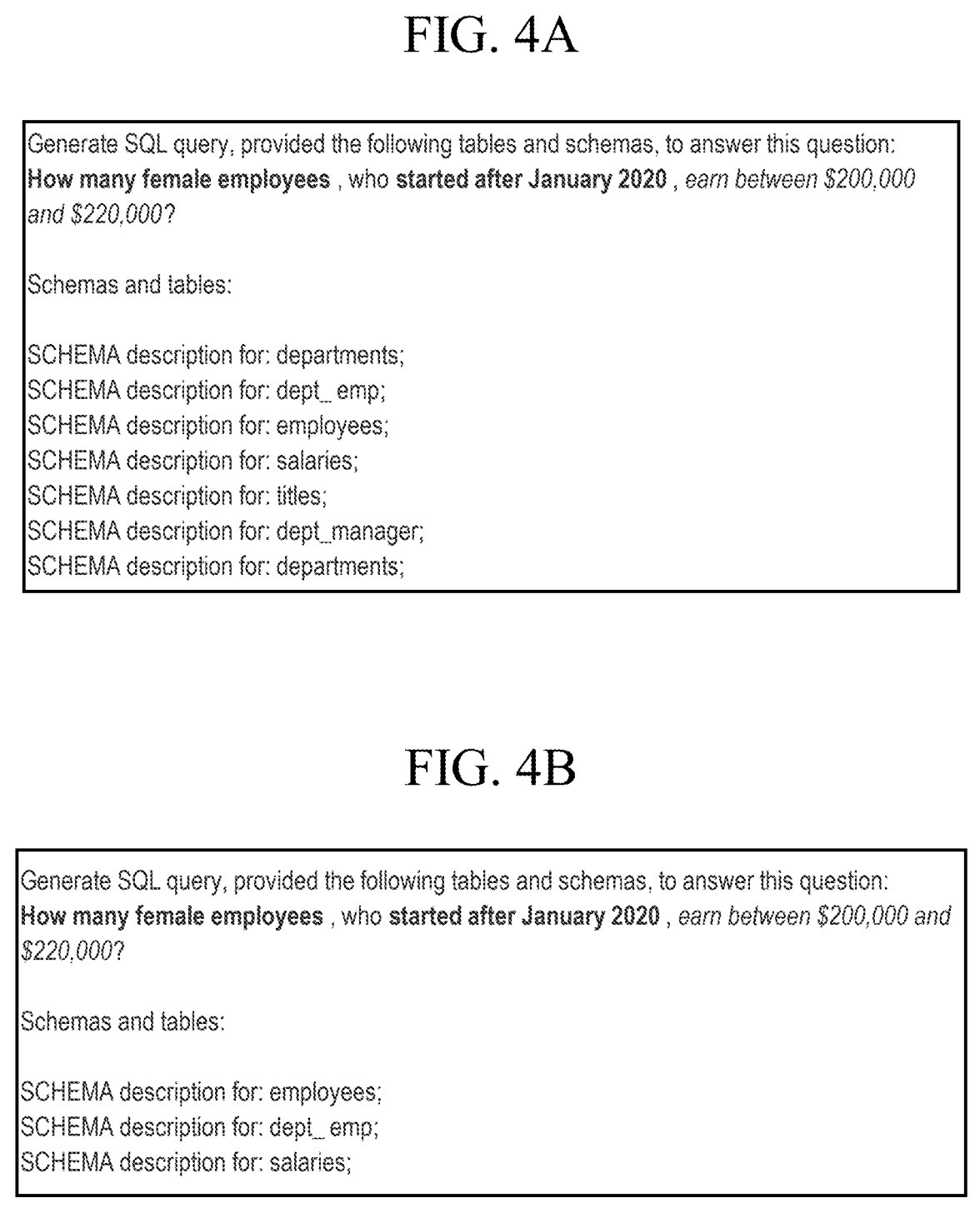

Generate SQL query, provided the following tables and schemas, to answer this question:
How many female employees , who started after January 2020 , *earn between $200,000 and $220,000*?

Schemas and tables:

SCHEMA description for: departments;
SCHEMA description for: dept_ emp;
SCHEMA description for: employees;
SCHEMA description for: salaries;
SCHEMA description for: titles;
SCHEMA description for: dept_manager;
SCHEMA description for: departments;

FIG. 4B

Generate SQL query, provided the following tables and schemas, to answer this question:
How many female employees , who started after January 2020 , *earn between $200,000 and $220,000*?

Schemas and tables:

SCHEMA description for: employees;
SCHEMA description for: dept_ emp;
SCHEMA description for: salaries;

DISPLAY
512
INPUT DEVICE
514
CURSOR CONTROL
516
MAIN MEMORY
506
ROM
508
STORAGE DEVICE
510
BUS
502
PROCESSOR
504
COMMUNICATION INTERFACE
518
500
SERVER
530
INTERNET
528
ISP
526
NETWORK LINK
520
LOCAL NETWORK
522
HOST
524

Figure 6:
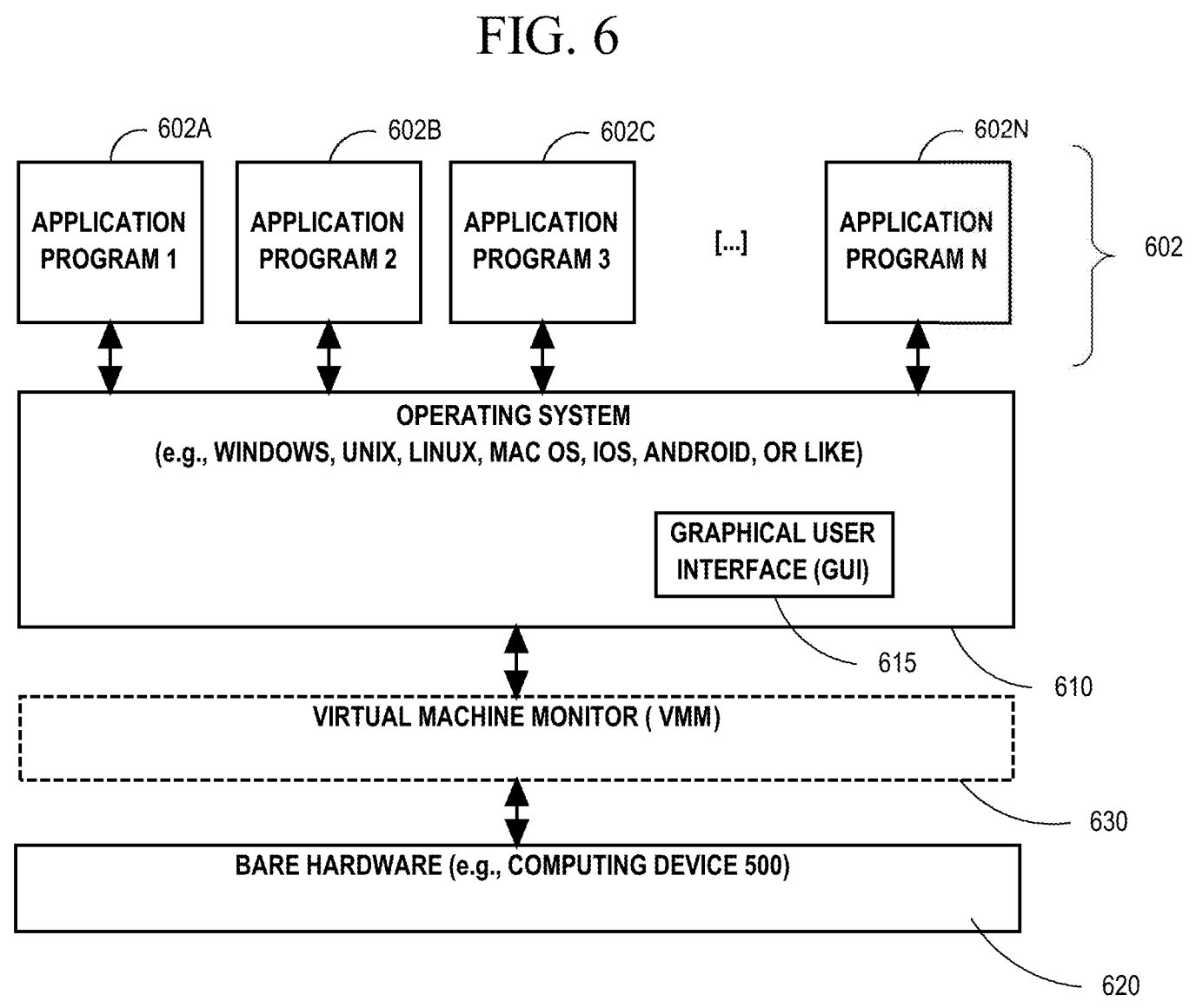

602A
APPLICATION PROGRAM 1

602B
APPLICATION PROGRAM 2

602C
APPLICATION PROGRAM 3

[...]

602N
APPLICATION PROGRAM N

610
OPERATING SYSTEM
(e.g., WINDOWS, UNIX, LINUX, MAC OS, IOS, ANDROID, OR LIKE)

615
GRAPHICAL USER INTERFACE (GUI)

630
VIRTUAL MACHINE MONITOR ( VMM)

620
BARE HARDWARE (e.g., COMPUTING DEVICE 500)

AUTOMATED PROMPT AUGMENTATION AND ENGINEERING USING ML AUTOMATION IN SQL QUERY ENGINE

CROSS-REFERENCE TO RELATED APPLICATIONS; BENEFIT CLAIM

This application claims the benefit of Provisional Application 63/563,211, filed Mar. 8, 2024, the entire contents of which are hereby incorporated by reference as if fully set forth herein, under 35 U.S.C. § 119(c).

TECHNICAL FIELD

The present disclosure relates to the use of large language models (LLMs) in a database system and, more particularly, to automated prompt augmentation for LLMs using information extracted from machine learning automation within the database system.

BACKGROUND

Generative artificial intelligence (generative AI, GenAI, or GAI) is artificial intelligence capable of generating text, images, videos, or other data using generative models, often in response to prompts. Generative AI models learn the patterns and structure of their input training data and then generate new data that has similar characteristics. Generative AI can benefit a wide range of industries, including software development, healthcare, finance, entertainment, customer service, sales and marketing, art, writing, fashion, and product design.

A large language model (LLM) is a computational model capable of language generation or other natural language processing tasks. As language models, LLMs acquire these abilities by learning statistical relationships from vast amounts of text during a self-supervised and semi-supervised training process. The largest and most capable LLMs are artificial neural networks built with a decoder-only transformer-based architecture, which enables efficient processing and generation of large-scale text data. Modern models can be fine-tuned for specific tasks or can be guided by prompt engineering.

For LLMs, the state-of-the-art solutions involve hand-crafting prompts for specific tasks or use cases. For example, generation of financial reports based on account activity would require a prompt that cannot be reused for a different use case, such as a prompt for a restaurant food recommendation. In both use cases, prompts may lack configurability for dynamic details.

On the other hand, some solutions involve overgeneralized prompts that are intended to accommodate reuse in different use cases. These prompts may include all potential context information to handle all use potential cases with only a small portion of the prompt that is specific to the specific task or use case. However, use of an LLM with a long context (to accommodate multiple use cases) results in a phenomenon referred to as "lost in the middle," meaning that model performance is highest when relevant information occurs at the beginning (primacy bias) or the end (recency bias) of the input context, while model performance degrades when relevant information is in the middle of the context. These examples illustrate the difficulty of utilizing a generic prompt that works for all use cases. Thus, a state-of-the-art prompt causes LLM inferencing to have low semantic accuracy (e.g., wrong or irrelevant information) and low task accuracy (e.g., wrong format, kind, or scope of generated output) unless used for a narrowly predefined scenario.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 4A depicts a naïve approach to generating a prompt to an LLM in accordance with an embodiment.

FIG. 4B depicts an approach to generating a prompt to an LLM based on information from ML automation in accordance with an embodiment.

FIG. 6 is a block diagram of a basic software system that may be employed for controlling the operation of a computer system upon which aspects of the illustrative embodiments may be implemented.

DETAILED DESCRIPTION

Figure 1:
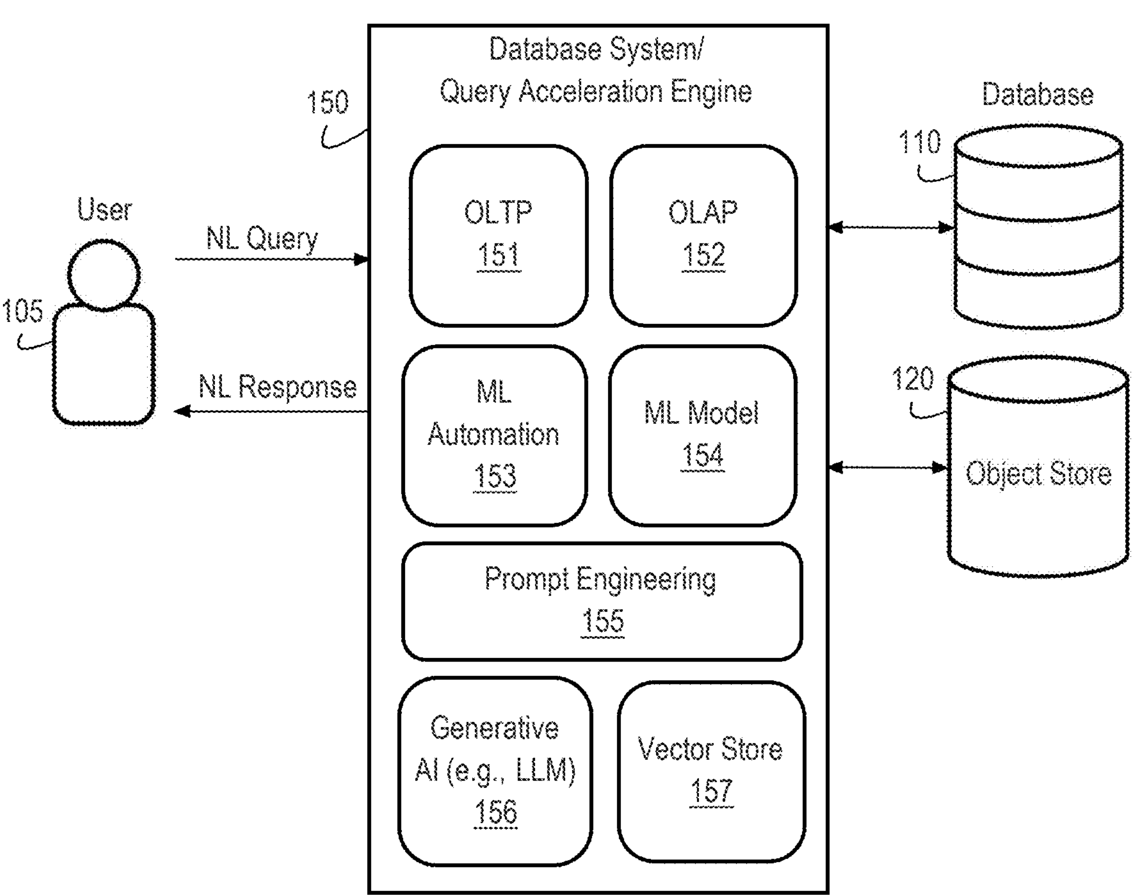
FIG. 1 is a block diagram illustrating a database system with an in-memory query acceleration engine in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The Oracle® HeatWave™ database system is an example of a fully managed database service, powered by an integrated in-memory query acceleration engine. The database service combines transactions, analytics, and machine learning services, delivering real-time, secure analytics without the complexity, latency, and cost of extract, transform, load (ETL) duplication. The Oracle® HeatWave™ database system also includes the HeatWave™ Lakehouse object storage, which allows users to query data stored in object storage in a variety of file formats.

The Oracle® HeatWave™ database system also includes the MySQL Autopilot™ machine learning (ML) automation component for improving the performance and scalability of the database system and in-memory query acceleration engine. The ML automation component provides many important and often challenging aspects of achieving high query performance at scale, including provisioning, data loading, query execution and failure handling. The ML automation component uses advanced techniques to sample data, collect statistics on data and queries, and build machine learning models to model memory usage, network load, and execution time. The ML automation component makes the in-memory query acceleration engine increasingly intelligent as more queries are executed, resulting in continually improving system performance over time.

The Oracle® HeatWave™ database system further includes generative artificial intelligence (AI) components that provide integrated and automated generative AI with in-database large language models (LLMs), an automated, in-database vector store, scale-out vector processing, and the ability to have contextual conversations in natural language. Users can use the in-database LLMs to help generate or summarize content based on unstructured documents. Users can ask questions in natural language via applications, and the LLM will process the request and deliver the content.

An embodiment uses an LLM or other machine learning (ML) model to narrow the search space to highly relevant information about a database. In one embodiment, a distinct instance of a classifier, a clustering algorithm, or a topic modeling model can be trained based on information from ML automation within the database system, respectively for each column or table in the database. Model instances can then be used during generative LLM inferencing to identify relevant sources of data to answer the user's question about the database. Thus, the embodiment combines ML automation and other ML models or LLM for topic modeling and schema description.

The embodiment uses natural language to SQL (NL2SQL) generation to convert a user's natural language query into a SQL query to obtain information about a database. In an embodiment, the user asks a natural language question about the database and tables, and the LLM provides a response about relevant tables and columns based on information received from the ML automation component. The embodiment uses information from ML automation to dynamically engineer a linguistic prompt to combine a user's question with schema, table, and column information. The user may then ask another question based on an inferentially generated answer to a previous question. In this way, the user may ask a series of interrelated questions to conduct an investigation about the database. In one example embodiment, a chat robot (chatbot) operates as an interactive expert that provides comprehension about the database.

In accordance with an embodiment, automated prompt augmentation and engineering can handle multiple use cases with high accuracy and speed. This approach uses metadata that describes database content provided by the ML automation component of the database system. Prompt engineering leverages this information to generate a linguistic prompt. Information from the metadata of the database and a vector store can be used together. The linguistic prompt can further be augmented using ML inference to classify a user's question and the source of data from which the user's question should be answered.

In an embodiment retrieval augmented generation (RAG) dynamically taps into a knowledge base of reference documents, such as technical guidebooks and manuals, and proprietary application literature, such as functional specifications and design documents, for increased accuracy of the linguistic prompt. A vector store associates each reference document with a fixed-sized encoding that represents the document, referred to as a reference encoding or reference embedding. A vector store agent conducts a search of the vector store and augments the prompt with context based on results of the search. In one example embodiment, the vector store agent performs a similarity search based on embeddings of the documents and a query embedding of the user's query.

Database System With In-Memory Query Accleration

FIG. 1 is a block diagram illustrating a database system with an in-memory query acceleration engine in accordance with an embodiment. Database system 150 allows users, such as user 105, to search database 110 or object store 120. In an embodiment, database system 150 may be implemented as the MySQL open-source database or as Oracle InnoDB™ general-purpose storage engine. MySQL is a relational database management system (RDBMS), which stores data in separate tables rather than putting all the data in one big storeroom. The database structure is organized into files optimized for speed. The logical data model, with objects such as data tables, views, rows, and columns, offers a flexible programming environment. As the name implies, MySQL uses structured query language (SQL), and a user may enter SQL queries directly, embed SQL statements into code in another language, or use a language-specific application programming interface (API) that hides the SQL syntax.

In an embodiment, database system 150 includes an in-memory query acceleration component. A non-limiting example of a database system with an in-memory query acceleration engine is the Oracle® HeatWave™ database system. Database system 150 includes online transaction processing (OLTP) component 151, online analytical processing (OLAP) component 152, ML automation component 153, ML models component 154, prompt engineering component 155, generative AI component 156, and vector store 157. OLTP is a type of data processing that consists of executing a number of transactions occurring concurrently. OLAP is a type of data processing for answering multidimensional analytical (MDA) queries. OLTP component 151 allows users to run OLTP workloads on database 110, and OLAP component 152 allows users to run OLAP workloads.

ML Automation

ML automation component 153 analyzes data related to database operations, including information on queries, data loading, and resource utilization. ML automation component 153 generates and analyzes intensive data about a database, including static information, such as schema details, and dynamic information, such as content statistics. ML automation component 153 also includes ML models that predict resource usage and query performance. Thus, ML automation component 153 has ample ML infrastructure that has more or less direct access to a database schema, content statistics, and usage statistics. This integration makes the ML automation suitable for implementing database ML innovations and insight models.

ML automation component 153 uses advanced machine learning techniques to automate the database system 150 and in-memory query acceleration and to improve performance and scalability. A non-limiting example of an ML automation component is the Oracle® HeatWave™αAutopilot ML automation component. The ML automation component 153 focuses on four aspects of the service lifecycle: system setup, data load, query execution, and failure handling. ML automation component 153 includes the following capabilities:

- Auto provisioning predicts the number of compute nodes required for running a workload by adaptive sampling of table data on which analytics is required. This means that customers no longer need to manually estimate the optimal size of the cluster.
- Auto parallel load optimizes the load time and memory usage by predicting the optimal degree of parallelism for each table being loaded into the database system 150.
- Auto data placement predicts the column on which tables should be partitioned in-memory to help achieve the best performance for queries. It also predicts the expected gain in query performance with the new column recommendation. This minimizes data movement across nodes due to suboptimal choices that can be made by operators when manually selecting the column.
- Auto encoding determines the optimal representation of columns being loaded into the database system 150, taking the queries into consideration. This optimal representation provides the best query performance and minimizes the size of the cluster to minimize costs.
- Auto query plan improvement learns various statistics from the execution of queries and can improve the execution plan of future queries. This improves the performance of the system as more queries are run.
- Auto query time estimation estimates the execution time of a query prior to executing the query. This provides a prediction of how long a query will take, enabling customers to decide if the duration of the query is too long and instead run a different query.
- Auto change propagation intelligently determines the optimal time when changes in MySQL database should be propagated to the database system's scale-out data management layer. This helps ensure that changes are being propagated at the right optimal cadence.
- Auto scheduling determines which queries in the queue are short running and prioritizes them over long running queries in an intelligent way to reduce overall wait time. Most other database systems use the First In, First Out (FIFO) mechanism for scheduling.
- Auto error recovery provisions new nodes and reloads necessary data if one or more database system nodes are unresponsive due to software or hardware failure.

Thus, ML automation component 153 uses ML techniques to implement or improve system setup, data load, query execution, and failure handling using statistics and model predictions or classifications. These statistics may include, for example, user-specific workload statistics, overall workload statistics, database table statistics, query performance statistics, etc.

In-Database ML Models

ML model component 154 supports in-database machine learning (ML) to fully automate the ML lifecycle and store all trained models inside the MySQL database 110, eliminating the need to move data or the model to a machine learning tool or service. ML model component 154 provides the following capabilities compared to other cloud database services:

- Fully Automated Model Training: All of the different stages in creating a model with ML model component 154 are fully automated and do not require any intervention from developers. This results in a tuned model that is more accurate, requires no manual work, and ensures the training process is always completed.
- Model and Inference Explanations: Model explainability helps developers understand the behavior of a machine learning model. Prediction explainability is a set of techniques that help answer the question of why a machine learning model made a specific prediction. ML model component 154 integrates both model explanation and prediction explanations as a part of its model training process.
- Hyper-Parameter Tuning: ML model component 154 implements a new gradient search-based reduction algorithm for hyper-parameter tuning. This enables the hyper-parameter search to be executed in parallel without compromising the model accuracy. Hyper-parameter tuning is the most time-consuming stage of ML model training, and this unique capability provides a significant performance advantage over other cloud services for building machine learning models.
- Algorithm Selection: ML model component 154 uses the notion of proxy models, which are simple models exhibiting the properties of a full complex model, to determine the best ML algorithm for training. Using a simple proxy model, algorithm selection is done very efficiently without loss of accuracy.
- Intelligent Data Sampling: During model training, ML model component 154 samples a small percentage of the data in order to improve performance. This sampling is done in such a manner that all representative data points are captured in the sample data set.
- Feature Selection: Feature selection helps determine the attributes of the training data which influence the machine learning model behavior for making predictions. The techniques in ML model component 154 for feature selection have been trained over a broad swath of data sets across multiple domains and applications. From these gathered statistics and meta information, ML model component 154 is able to efficiently identify the relevant features in a new data set.

Thus, ML model component 154 provides capabilities for ML model training, tuning, and implementation.

Generative AI

Generative AI component 156 is an integrated platform that combines generative artificial intelligence (AI) with the existing in-memory database technology of database system 150. Generative AI component 156 is specifically integrated with the MySQL database service. Generative AI component 156 leverages the in-memory architecture of the database system 150 to provide efficient processing for the large language models (LLMs) and vector store 157 that power its generative AI capabilities.

In some embodiments, generative AI component 156 uses in-database, optimized LLMs to instantly benefit from generative AI, and have contextual conversations informed by unstructured documents using natural language. Generative AI component 156 may achieve more accurate and contextually relevant answers by letting LLMs search proprietary documents, without AI expertise or moving data to a separate vector database. Vector store 157 is integrated and automates embedding generation. Generative AI component 156 builds, trains, and explains ML models using data in object storage 120 and MySQL database 110.

Vector Store

With support for generative AI, users 105 can interact with database system 150 in natural language. Both the user queries and the response from the system can be generated in natural language using a Large Language Model (LLM).

In some embodiments, LLMs are trained on public data, and for organizations looking to leverage LLM capabilities for enterprise data, the results can be incorrect due to the hallucination problem of LLMs, and lack of enterprise knowledge. In order to mitigate this problem, database system 150 includes vector store 157.

Vector store 157 uses a language encoder to create vector embeddings from documents, which can be stored in variety of formats. Vector store 157 also takes the question asked by the user to create vector embeddings and does a similarity search in an n-dimensional space. The output of the vector store is context, included along with the users' question in a prompt, which is the input to the LLM. The LLM uses this information to generate a response, which now includes proprietary information from the documents in object store 120.

In one embodiment, vector store 157 represents each passage of documents in object store 120 as a vector, which can be stored as a row in a database table. For instance, each passage may be a paragraph in a document, and the vector may include a document identifier, an author, a publication date, a chapter identifier, a page number, an offset of the paragraph on the page, and an encoding of the text of the passage, also referred to herein as an embedding. Thus, for a given document, the rows for passages of the given document will have unique embeddings for the passages; however, the document identifier (or document embedding) will be the same. This allows the system to filter by document, date, author, etc., and then perform a similarity search for passages. The manner in which passages are represented may vary depending on the implementation. In an embodiment, the vector representations are stored in database 110. Vector store 157 provides very fast searching of unstructured data by providing embeddings that are searched by similarity score rather than pattern matching, which can be slow and very resource intensive. In some embodiments, passages from vector store 157 can be provided as context in a prompt.

Prompt Engineering and Augmentation

In an embodiment, an LLM or other machine learning (ML) model is used to narrow a search space to highly relevant information about a database. In one embodiment, a distinct instance of a classifier, a clustering algorithm, or a topic modeling model can be trained based on information from ML automation component 153, respectively for each column or table in the database. Prompt engineering component 155 then uses model instances during generative LLM inferencing to identify relevant sources of data to answer a natural language query, from user 105, about database 110.

In an embodiment, database system 150 is an elastic cloud database service, and ML automation component 153 analyzes data related to database operations, including information on queries, data loading, and resource utilization. In other words, ML automation component 153 generates and analyzes intensive data about database 110, including static information, such as schematic details, and dynamic information, such as content statistics. ML automation component 153 uses machine learning models that predict resource usage and query performance. Thus, ML automation component 153 has ample machine learning infrastructure that has more or less direct access to database schema, content statistics, and usage statistics. That integration makes ML automation component 153 suitable for implementing database machine learning innovations and the insight models for prompt engineering and augmentation.

Prompt engineering component 155 leverages knowledge about a database, such as schema, table and column names, and aggregated column or table statistics to increase generative AI (e.g., LLM) 156 inference speed and accuracy by engineering and augmenting a linguistic prompt provided to the LLM. Vector store 157 metadata is used to dynamically customize a prompt and an LLM response for a specific line of business and a specific summarization task. Table and column aggregated statistics (e.g., range, mean, nulls, cardinality) and description are collected and used for prompt engineering. This approach eliminates the need for a user to specify relevant tables and columns. For example, a user might not know or understand the database schema or structured query language (SQL) which, herein, is not an impediment to database investigation by the user. This approach accelerates LLM inference because there is no need to explore all tables during inference. This increases accuracy because irrelevant information is not reflected in the final prompt to the LLM, thus addressing the "lost in the middle" problem inherent with LLMs using prompts with long contexts.

In an embodiment, prompt engineering component 155 uses natural language to SQL (NL2SQL) generation using (1) information from ML automation component 153 and, as inferred from the ML automation information by insight models, (2) a database description, which increases analytic and summarization accuracy and user ergonomics. State-of-the-art NL2SQL techniques require multiple examples and comprehensive (i.e., exhaustive and formal) schema information in order to generate correct SQL. Utilizing metadata from ML automation component 153 eliminates or reduces the requirement to provide formal schema information or examples. Instead, prompt engineering component 155 can dynamically generate or augment a linguistic prompt to combine a user's question with schema, table, and column information.

User interaction with data using natural language is facilitated by leveraging information contained in metadata of ML automation component 153. User 105 can ask a natural language question about the database and tables, and an LLM can provide a response about relevant tables and columns because of ML automation integration. User 105 may then ask another question based on an inferentially generated answer to a previous question. In this way, user 105 may ask a series of interrelated questions to conduct an investigation about database 110. In an example embodiment, generative AI component 156 may include a chat robot (chatbot) that operates as an interactive expert that provides comprehension about database 110.

Some embodiments provide automated prompt augmentation and engineering that can handle multiple use-cases with high accuracy and speed. Prompt engineering component 155 utilizes metadata that describes relational database contents provided by ML automation component 153. Prompt engineering component 155 leverages this information to generate a linguistic prompt. Information from metadata of the database and vector store 157 can be utilized together. The linguistic prompt can further be augmented using ML inference to classify a user's question and the source of data from which the user's question should be answered.

Prompt augmentation can be especially important when interacting with data, such as in cases of natural language to SQL (NL2SQL) use-cases. In those cases, user 105 provides a natural language question, referred to herein as an interactive question, to database system 150 with the intent of extracting information from structured or unstructured data. For example, a manager in an organization may have a question about multiple employees, their individual salaries, and the last time each received a raise in salary. This would require getting information from at least three separate tables. Furthermore, only a few columns would need to be selected from those tables. After the schematic data is dynamically discovered automatically, the schematic data must be specified in a linguistic prompt to generatively infer a natural language response (i.e., answer) to return to the user. Needless to say, this is a complex task for just a single use-case. Therefore, flexible automation of this task is very important.

Retrieval augmented generation (RAG) dynamically taps into a knowledge base of reference documents such as technical guidebooks and manuals and proprietary application literature such as functional specifications and design documents for increased accuracy of the linguistic prompt. In a preparation phase before the generative AI component 156 is in service, a knowledge index of existing structured (e.g., JSON, XML, and HTML) and unstructured (e.g. prose, word processor) reference documents are created in vector store 157 or an indexed database. Whether structured or unstructured, a reference document may partially or entirely contain natural language, such as multiword terms, phrases, sentences, and paragraphs. Each reference document has a fixed-size dense semantic encoding that may, for example, be inferred by a trained encoder model that uses natural language processing (NLP) to accept an input document as a sequence of lexical tokens. For example, the encoder model may be a large language model (LLM) such as bidirectional encoder representations from transformers (BERT). In an embodiment, vector store 157 associates each reference document with its fixed-sized encoding that represents the document, referred to herein as a reference encoding.

After the preparation phase is a conversation phase in which the generative AI component 156 is in service. In an embodiment, the conversation phase is performed by a vector store agent that is a program or process that uses content retrieval to enhance analytics, decisioning, and/or task reasoning. In an embodiment, vector store 157 and prompt engineering component 155 are parts of the vector store agent. The conversation phase has a search stage that uses vector store 157 followed by a generative stage. The vector store agent operates the search stage and then operates prompt engineering, which is an early part of the generative stage. Subsequently, a generative model operates a later part of the generative stage.

The search stage may use instances of a classifier, a clustering algorithm, or a topic modeling model, within ML model component 154, to provide respective information about the user's question and about each column or table in the database. These ML models 154, referred to herein as insight models, help the vector store agent decide which tables and columns are relevant to (i.e., implicated by) the user's question. For example, a question model may infer that the user's question contains geographic place names, and a column model may infer which table columns contain geographic place names. Inferred output of any of those models is referred to as a schematic insight or, if from the question model, a question insight. A combination of the user's question and all inferred insights is referred to as a search key.

The search stage may entail sequentially: a) generating a sequence of lexical tokens that represents the search key, b) the encoder model accepts the tokens sequence as input, c) the encoder model infers a fixed-size encoding that represents the tokens sequence, referred to herein as the search encoding, c) the knowledge index accepts the search encoding as a lookup key, and d) the knowledge index selects and returns reference document(s) represented by the nearest (i.e., semantically most similar to the search encoding) one or few already stored reference encodings. In an embodiment, (d) is accelerated because the search key limits the scope of the search for matching reference documents.

Similarity may be measured by semantic distance such as multidimensional-space vector distance, e.g., Euclidian or Manhattan distance. For example, the knowledge index may implement a nearest neighbor search. The output of the search stage is a dynamically selected set of highly relevant (i.e., semantically similar) reference documents, referred to herein as matching documents because they semantically match the search key. For example, the matching documents may be ranked (i.e., sorted) by similarity score such as measured semantic distance, and that score (i.e., distance) is based on comparison of a reference encoding to the search encoding, which does not entail accessing the reference document represented by the reference encoding. However, alternative embodiments may not require ranking.

A generative model, such as an LLM, is shown as generative AI component 156 in FIG. 1. The generative model is not the encoder model (not shown in FIG. 1) although both may be LLMs, for example. The generative stage entails sequentially: a) generating (e.g., by the vector store agent) a linguistic prompt based on the search key and the matching documents, b) the generative model accepting the linguistic prompt as input, and c) the generative model inferring (i.e., generating) natural language. The generative model may perform summarization or recommendation when inferentially generating an answer to the user's question.

Figure 2:
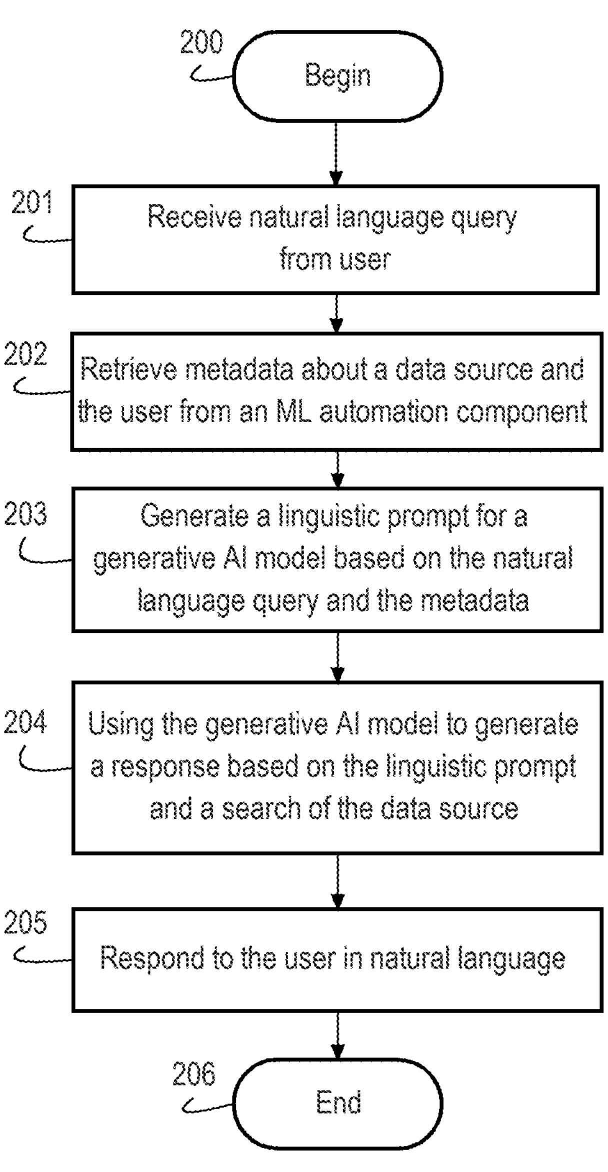
FIG. 2 is a flowchart illustrating operation of prompt engineering and augmentation for using in-database generative AI to provide a response to a natural language query in accordance with an embodiment.

FIG. 2 is a flowchart illustrating operation of prompt engineering and augmentation for using in-database generative AI to provide a response to a natural language query in accordance with an embodiment. Operation begins (block 200), and a database system receives a natural language query from a user (block 201). The database system retrieves metadata about a data source and the user from an from ML automation component (block 202). The data source may be a relational database comprising one or more database tables or an object store comprising one or more vector stores representing a plurality of documents using semantic encodings. The ML automation component may include ML models for predicting resource usage and query performance.

The database system then generates a linguistic prompt for a generative AI model (e.g., an LLM) based on the natural language query and the metadata received from ML automation (block 203). In one embodiment, the generative AI model comprises a large language model (LLM), and the natural language query is a query about the relational database.

In another embodiment, the generative AI model comprises a natural language to structured query language (NL2SQL) generative model, and the NL2SQL generative model is configured to generate one or more SQL queries for searching the relational database based on the linguistic prompt. In some embodiments, the database system provides the linguistic prompt as input to the NL2SQL generative model to generate SQL queries. The database system may then execute the SQL queries against the one or more database tables to generate a search result or may cause the SQL queries to be displayed to the user. In one embodiment, the database system may provide the search result as input to a large language model to generate a natural language description of the search result.

In another embodiment, the database system may generate the linguistic prompt by selecting a subset of database tables based at least in part on the metadata and add schema descriptions for the subset of database tables to the linguistic prompt. In one embodiment, the database system adds the schema descriptions by generating query embeddings based on the natural language query and selecting the subset of database tables based at least in part on similarity of the one or more query embeddings and per-table topic modeling embeddings of the one or more database tables.

In another embodiment, the data source is an object store comprising one or more vector stores representing a plurality of documents using semantic encodings, and the database system generates the linguistic prompt by filtering the one or more vector stores based on the metadata, as discussed above.

The database system uses the generative AI model to generate a response based on the linguistic prompt and a search of the data source (block 204). The linguistic prompt limits a scope of the search of the data source based on the metadata. In one embodiment, the database system generates zero or more queries and executes them to extract relevant data. ML automation, such as the Oracle® HeatWave™ Autopilot ML automation component, may be used during this search stage.

The database system responds to the user in natural language (block (205). In some embodiments, the database system engineers a prompt to respond back to the user with the data extracted during search of the data source in natural language. Thereafter, operation ends (block 206).

In one embodiment, the following pseudocode may implement this generative stage and may be performed by the prompt engineering component 155 shown in FIG. 1, for example, or by the vector store agent:

1. Classify the source(s) of data that must be queried to provide a response to the user. For this step, either a ML model (e.g., classification or clustering model) or LLM inference (e.g., N-shot classification) can be utilized. Example: "Which of the following tables {Autopilot extracted tables} would be useful in responding to this question {User's question}?" Response: {List of relevant tables}
2. Utilize an LLM model to determine relevant tables and columns that must be queried to obtain relevant information. The table and column information comes from ML automation, which is aware of table schema and aggregated statistics of every column. This information can readily be utilized to augment a prompt for an LLM, so that relevant information can be extracted. Furthermore, the same information can be used to structure a prompt that is used for an LLM to generate a natural language response back to the user. Example: "From the following tables {List of relevant tables}, which columns are relevant in responding to this question {User's question}?" Response: {List of columns}, e.g., list of columns from table A, list of columns from table B, etc.
3. Generate a query (or multiple queries) to extract relevant information from columns in tables or databases based on determination in step 2. Response: {Extracted data}
4. Engineer a prompt to respond back to the user with the extracted data in natural language. Example: "Provide an informative response to the following question {User's question} given the following information {Extracted data} was extracted from these columns {List of columns} contained in these tables {List of relevant tables}."

The above pseudocode is dynamic and contextual, which increases accuracy. The pseudocode contains placeholders at which: a) the prompt engineering component 155 uses dynamically obtained context information, and b) some of the context becomes available and has a response that contains some of the context, such as insights inferred by insight models or query results from database(s). For example, multiple databases may be implicated by a user's question and may be used to infer an answer to that question. That is, the generative phase may inferentially answer an interactive question about multiple databases even including, for example, a database of which a naive user may be unaware.

Accurately inferred answers based on dynamic context helps the user to quickly understand the database. The ergonomics of this assistive automation is unprecedented. Here, ergonomics is a quantitative performance metric that may be based on one, some, or all of the following measurements: a) time spent reading and understanding an inferred answer and b) an amount of data and metadata accessed during the generative phase. Both of those measurements and latency of the generative phase are reduced by this generative AI application due to the increased relevance (i.e., accuracy) of one or multiple linguistic prompts to distinct LLMs.

In various embodiments, the insight models, the encoder model, and the generative model may or may not all be LLMs. Such LLMs accept distinct dynamically generated linguistic prompts as input, respectively referred to herein as an insight prompt, an encoder prompt, and a generative prompt. For the encoder prompt and the generative prompt, the database is explored much more efficiently when prompt augmentation and generation are connected to ML automation and using the insight prompt(s), for example. In one use case, it is possible for insight prompts to ask natural language questions about data, to gather information about which tables and columns are of relevance to the user's question. This way, the generative model returns responses about database artifacts (such as schemas, tables, and columns) without the generative model itself having to query those artifacts or actually interact with database data. This could help a database user to quickly obtain and understand a high-level view of a database and how to formulate a strategy or resolve a problem occurring in an application domain, for example.

Steps 1 and 2 generate insight prompts for an internal operational use to reduce the overall search space, making the generative model more accurate and faster. Step 3 is an optional step that generates database queries to retrieve relevant data from or about: a) a relational database, b) structured or semi-structured data from an object store, such as comma separated values (CSV) spreadsheets, Apache Parquet™ software and storage format, or Apache Avro™ software and storage format, or c) unstructured (e.g., natural language) data from the vector store 157. Pseudocode step 4 generates the generative prompt from which the generative model will infer an answer to the user's question. Due to the accuracy of the generative prompt, when an answer is subsequently inferred, the answer will contain highly accurate natural language, such as multiword terms, phrases, sentences, and paragraphs.

Prompt Engineering Example

ML automation component 153 is aware of a user's workload by relying on machine learning models to make predictions that help database system 150 to automate provisioning, shape prediction, data placement, query optimization, and query execution. ML automation component 153 samples data to obtain features and to predict the necessary parameters for optimization. Data sampling allows ML automation component 153 to acquire accurate statistics for all columns in every table on top of schema and entity relationship knowledge. The knowledge of workload, along with the schema and tables, can significantly improve retrieval and generation accuracy and speed.

In accordance with an embodiment, ML automation component 153 improves natural language interactions with data by incorporating knowledge of workload from ML models into prompt engineering. This knowledge may include: a user's workload awareness; knowledge of tables, schemas, and column-wise statistics; and, a user's previous interactions with data in different tables. This can be applied to structured files in a relational database 110, such as Oracle InnoDB™ MySQL database, or the Oracle Cloud Data Lakehouse, or to unstructured files in an object store 120 via vector store 157. These enhancements improve user experience, accuracy, and speed of data retrieval for augmented generation and NL2SQL generation by retrieving data only from relevant vector stores and tables and by choosing tables, resulting in faster and more accurate data retrieval, and schemas in NL2SQL based on past user behavior, resulting in more accurate and user-friendly results.

Figure 3:
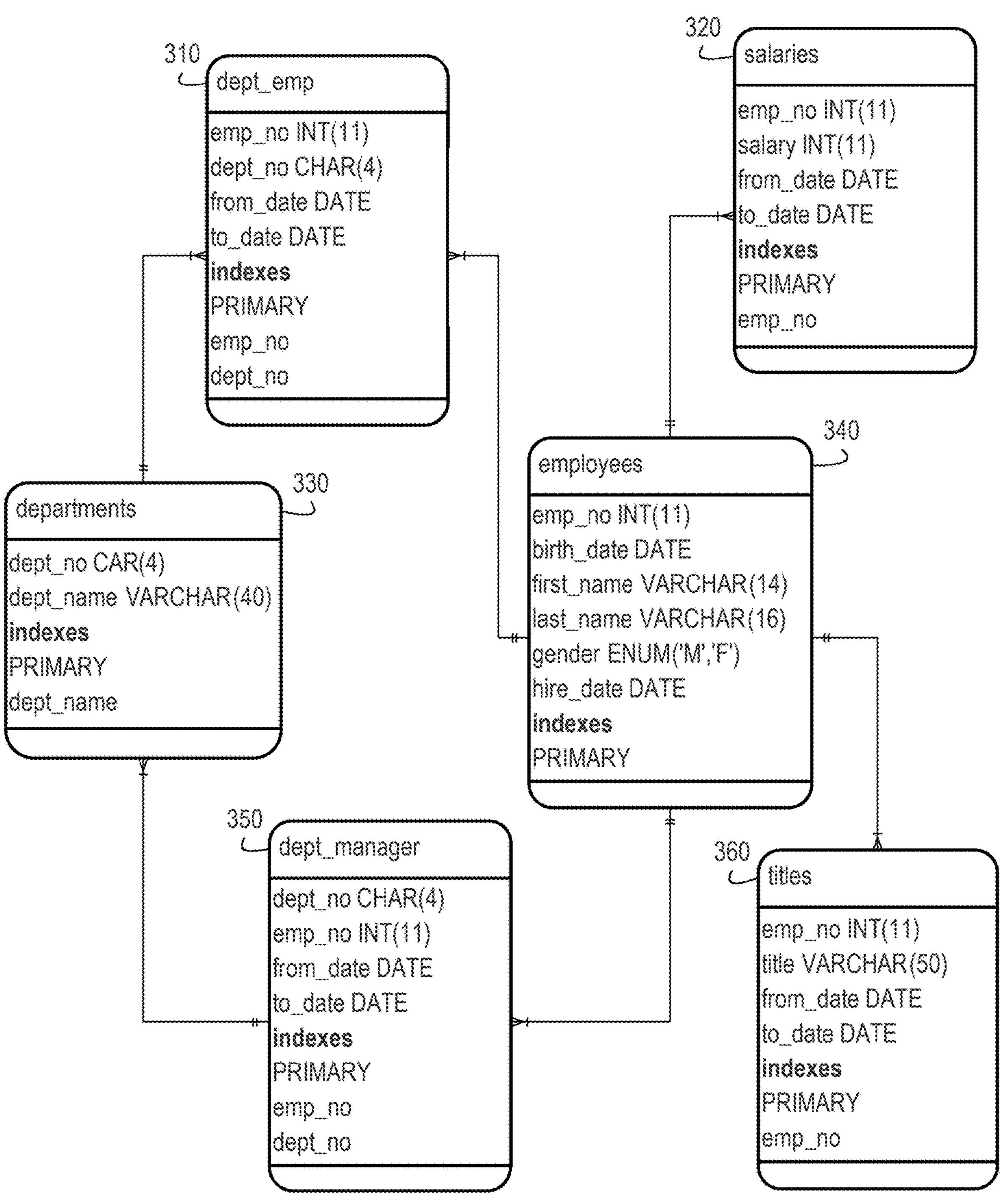
FIG. 3 illustrates an example database schema upon which a prompt can be engineered for a user query to improve speed and accuracy of LLM generation in accordance with an embodiment.

FIG. 3 illustrates an example database schema upon which a prompt can be engineered for a user query to improve speed and accuracy of LLM generation in accordance with an embodiment. This schema includes six tables: department employee (dept_emp) 310, salaries 320, departments 330, employees 340, department manager (dept_manager) 350, and titles 360. During operation of database system 150, ML automation component 153 may perform automation functions, such as data placement, query plan improvement, query time estimation, etc. ML automation component 153 performs these functions by learning the database schema, workload statistics for users, and performance statistics. Thus, in an example implementation, ML automation component 153 knows that employees table 340 is accessed 80% of the time, dept_emp table 310 is accessed 10% of the time, salaries table 320 is accessed 8% of the time, and the remaining tables combined are accessed 2% of the time. Thus, ML automation component 153 can deduce that a query is most likely to access employees table 340 and is very unlikely to access departments table 330, for example.

Consider user 105 submits the following natural language query:

How many female employees, who started after January 2020, earn between $200,000 and $220,000?

Given the database schema shown in FIG. 3, one can deduce that the query will require at least the employees table 340 and the salaries table 320. Furthermore, the query will access the gender column and the hire_date column of employees table 340 and the salary column of the salaries table 320.

FIG. 4A depicts a naïve approach to generating a prompt to an LLM in accordance with an embodiment. This approach uses a template beginning with "Generate SQL query, provided the following tables and schemas, to answer this question:" with the user's query and the database schema inserted into the template. Without any knowledge about which tables and columns are likely to be accessed, the tables and schemas include all tables in the database schema. Note that the full schema descriptions would be included in an actual implementation, including columns, data types, lengths, indexes, etc. This results in a very long context. As mentioned previously, LLMs encounter a problem with long contexts referred to as the "lost in the middle" problem. Due to primacy bias and recency bias, LLM performance degrades when relevant information is in the middle of the context. Including schema descriptions for tables and columns that are unlikely to be accessed increases the likelihood that the LLM will provide results that have low semantic accuracy and low task accuracy.

However, because ML automation component 153 is aware of the most commonly used tables by a user, or all users, prompt engineering component 155 can provide schema for only the three or four most commonly used tables instead of all tables. FIG. 4B depicts an approach to generating a prompt to an LLM based on information from ML automation in accordance with an embodiment. In this case, the context in the prompt is only half as long as the naïve approach shown in FIG. 4A. Additionally, the LLM would only be provided with relevant tables and schema descriptions, thus making the LLM faster and more accurate.

Moreover, a more complex database can have tens or even hundreds of tables. Such a large number of tables and columns would make the prompt size very large. Accuracy of LLMs diminishes with large prompt sizes, because LLMs lose context of information buried in the middle of the prompt, as mentioned above. Typically, LLMs are only good at extracting information from the beginning or the end of the prompt and can lose a significant amount of accuracy if relevant information is in the middle of the prompt. Also, prompt processing time and generation time become excessively long for large prompts, making the model less user-friendly. In some use cases, the prompt can exceed a maximum allowed number of input tokens, losing information due to truncation or even causing truncated output. This would make the generated response unusable.

In some embodiments, in addition to the most frequently used tables and columns, some tables can be added or removed based on topic modeling. In this approach, the user's input query embeddings would be matched against per-table topic modeling embeddings. Tables with high similarities (e.g., cosine similarity scores) to the user's query can be added to the prompt. Those with low similarities can be dropped from the prompt, further refining the prompt engineering.

In an embodiment, the database system uses NL2SQL to generate one or more SQL queries based on the prompt of FIG. 4B. In one embodiment, the database system can return the SQL queries to the user for review and editing. Alternatively, the database system can execute the SQL queries and generate query results. In one embodiment, the database system can return the query results to the user. In another embodiment, the database system then generates a prompt for an LLM including the user's query and the query results as context. The LLM generates a natural language response explaining the query results as an answer to the user's query.

Thus, the user can ask questions about one or more databases. For example, the user can ask about which tables must be queried to answer a particular question. In this case, the user may not particularly care about the answer to the question but is asking about the database schema. Thus, the user may be skilled in generating SQL queries but is unfamiliar with a particular database. In another example, a user can ask what a query that answers a given question would look like. Again, the user may not care about the answer to the query but wants to explore the structure and syntax of SQL queries. In this case, the user may be new to SQL and is learning to generate SQL queries by exploring examples using a particular database. In addition, a user and the database system may engage in a back-and-forth conversation with the user asking questions based on previous answers provided by the database system.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
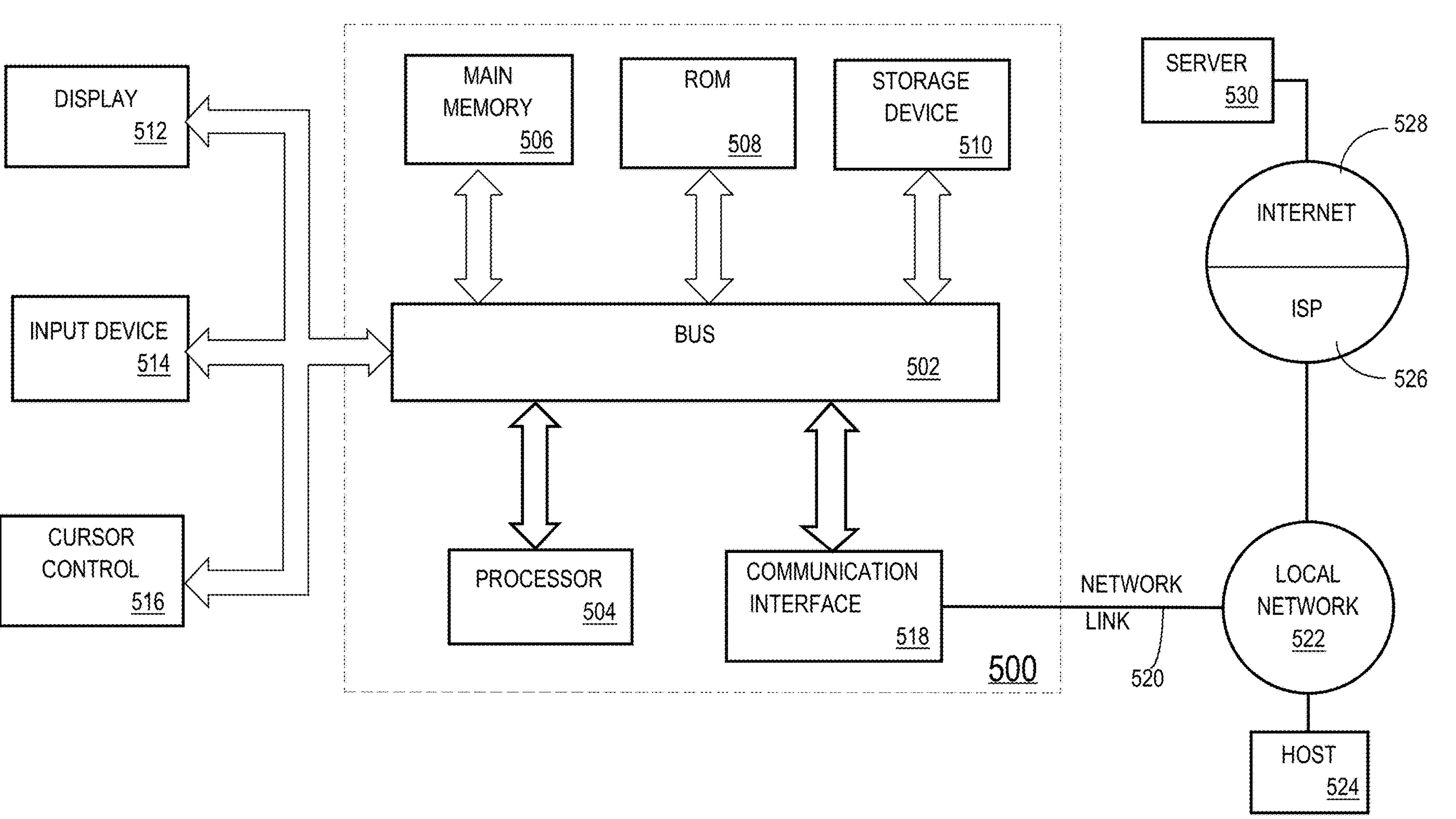
FIG. 5 is a block diagram that illustrates a computer system upon which aspects of the illustrative embodiments may be implemented.

For example, FIG. 5 is a block diagram that illustrates a computer system 500 upon which aspects of the illustrative embodiments may be implemented. Computer system 500 includes a bus 502 or other communication mechanism for communicating information, and a hardware processor 504 coupled with bus 502 for processing information. Hardware processor 804 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computer system 500 upon which aspects of the illustrative embodiments may be implemented. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:

receiving a natural language query from a user;

retrieving metadata from a machine learning (ML) automation component of a database system, the metadata comprising at least one of:

workload statistics of one or more users of the database system, schematic details of a data source, or dynamic content statistics of the data source;

generating a linguistic prompt, based on the metadata and the natural language query received from the user, for a generative artificial intelligence (AI) model; and generating, by the generative AI model, a response based on the linguistic prompt and a search of the data source, wherein the linguistic prompt limits a scope of the search of the data source based on the metadata, wherein the method is performed by one or more computing devices.

2. The method of claim 1, wherein the metadata is generated by one or more machine learning models for predicting resource usage and query performance in the database system.

3. The method of claim 1, wherein:

the data source is a relational database comprising one or more database tables, the generative AI model comprises a large language model (LLM), and the natural language query is a query about the relational database.

4. The method of claim 1, wherein:

the data source is a relational database comprising one or more database tables, the generative AI model comprises a natural language to structured query language (NL2SQL) generative model, and the NL2SQL generative model is configured to generate one or more SQL queries for searching the relational database based on the linguistic prompt.

5. The method of claim 4, further comprising:

providing the linguistic prompt as input to the NL2SQL generative model to generate the one or more SQL queries.

6. The method of claim 5, further comprising:

causing the one or more SQL queries to be displayed to the user.

7. The method of claim 5, further comprising:

executing the one or more SQL queries against the one or more database tables to generate a search result.

8. The method of claim 7, further comprising:

providing the search result as input to a large language model to generate a natural language description of the search result.

9. The method of claim 1, wherein:

the data source is a relational database comprising one or more database tables, and generating the linguistic prompt comprises adding a set of one or more schema descriptions by selecting a subset of database tables from the one or more database tables based at least in part on the metadata and adding schema descriptions for the subset of database tables to the linguistic prompt.

10. The method of claim 9, wherein adding the set of one or more schema descriptions further comprises:

generating one or more query embeddings based on the natural language query; and selecting the subset of database tables based at least in part on similarity of the one or more query embeddings and per-table topic modeling embeddings of the one or more database tables.

11. The method of claim 1, wherein:

the data source comprises an object store comprising one or more vector stores representing a plurality of documents using semantic encodings, and generating the linguistic prompt comprises filtering the one or more vector stores based on the metadata.

12. The method of claim 1, wherein the ML automation component performs at least one of:

auto provisioning, auto parallel loading, auto data placement, auto encoding, auto query plan improvement, auto query time estimation, auto change propagation, auto scheduling, or auto error recovery.

13. One or more non-transitory computer-readable media storing instructions which, when executed by one or more processors, cause:

receiving a natural language query from a user;

retrieving metadata from a machine learning (ML) automation component of a database system, the metadata comprising at least one of:

workload statistics of one or more users of the database system, schematic details of a data source, or dynamic content statistics of the data source;

generating a linguistic prompt, based on the metadata and the natural language query received from the user, for a generative artificial intelligence (AI) model; and generating, by the generative AI model, a response based on the linguistic prompt and a search of the data source, wherein the linguistic prompt limits a scope of the search of the data source based on the metadata.

14. The one or more non-transitory computer-readable media of claim 13, wherein the metadata is generated by one or more machine learning models for predicting resource usage and query performance in the database system.

15. The one or more non-transitory computer-readable media of claim 13, wherein:

the data source is a relational database comprising one or more database tables, the generative AI model comprises a large language model (LLM), and the natural language query is a query about the relational database.

16. The one or more non-transitory computer-readable media of claim 13, wherein:

the data source is a relational database comprising one or more database tables, the generative AI model comprises a natural language to structured query language (NL2SQL) generative model, and the NL2SQL generative model is configured to generate one or more SQL queries for searching the relational database based on the linguistic prompt.

17. The one or more non-transitory computer-readable media of claim 13, wherein:

the data source is a relational database comprising one or more database tables, and generating the linguistic prompt comprises adding a set of one or more schema descriptions by selecting a subset of database tables from the one or more database tables based at least in part on the metadata and adding schema descriptions for the subset of database tables to the linguistic prompt.

18. The one or more non-transitory computer-readable media of claim 17, wherein adding the set of one or more schema descriptions further comprises:

generating one or more query embeddings based on the natural language query; and selecting the subset of database tables based at least in part on similarity of the one or more query embeddings and per-table topic modeling embeddings of the one or more database tables.

19. The one or more non-transitory computer-readable media of claim 13, wherein:

the data source comprises an object store comprising one or more vector stores representing a plurality of documents using semantic encodings, and generating the linguistic prompt comprises filtering the one or more vector stores based on the metadata.

20. The method of claim 1, wherein generating the linguistic prompt comprises generating a context portion of the linguistic prompt based on the metadata, wherein the context portion of the linguistic prompt limits the scope of the search of the data source.

* * * * *